United States Patent
Chiminello

(10) Patent No.: US 10,816,315 B2
(45) Date of Patent: Oct. 27, 2020

(54) CHECK METHOD OF WORM GEARS

(71) Applicant: TORNERIA FERRARO S.P.A., Cassola (VI) (IT)

(72) Inventor: Ruggero Chiminello, Bassano del Grappa (IT)

(73) Assignee: TORNERIA FERRERO S.P.A., Cassola (VI) (IT)

( * ) Notice: Subject to any disclaimer, the term of this patent is extended or adjusted under 35 U.S.C. 154(b) by 371 days.

(21) Appl. No.: 15/988,791

(22) Filed: May 24, 2018

(65) Prior Publication Data

US 2018/0372472 A1  Dec. 27, 2018

(30) Foreign Application Priority Data

Jun. 21, 2017 (IT) .................. 102017000068751

(51) Int. Cl.
  *G01B 5/20* (2006.01)
  *G01M 13/021* (2019.01)
  *F16H 55/08* (2006.01)

(52) U.S. Cl.
  CPC ........... *G01B 5/202* (2013.01); *G01M 13/021* (2013.01); *F16H 55/0806* (2013.01)

(58) Field of Classification Search
  CPC ... G01B 5/202; G01M 13/021; F16H 55/0806

USPC ....................................................... 702/168
  See application file for complete search history.

(56) References Cited

U.S. PATENT DOCUMENTS 4,297,788 A  11/1981  Sterki et al.

FOREIGN PATENT DOCUMENTS

| DE | 10123496 A1 | 12/2002 |
| JP | 2001141444 A | 5/2001 |

*Primary Examiner* — Michael P Nghiem
*Assistant Examiner* — Dacthang P Ngo
(74) *Attorney, Agent, or Firm* — Egbert, McDaniel & Swartz, PLLC

(57) ABSTRACT

A check method of worm gears includes the following steps: identification of a real profile (PR) of a worm gear to be checked; scanning of the real profile (PR) in such a way to obtain a measured profile (PM), filtering of the measured profile (PM) with a low pass filter in such a way to obtain a primary profile (PP), filtering of the primary profile (PP) with a high pass filter in such a way to obtain a surface analysis profile (SA), calculation of three parameters ($SA_a$; $SA_q$; $SA_p$) from said surface analysis profile (SA) and comparison of the three parameters ($SA_a$; $SA_q$; $SA_p$) with preset threshold values (TSa; TSq; TSp) in such a way to reject the worm gear when at least one of the parameters exceeds the corresponding threshold value.

8 Claims, 6 Drawing Sheets

| Dimension Specification | | | Group A<br>NO chattermarks | Group B<br>Light chattermaks | Group C<br>Big chattermars | Group F<br>Not rolled | Group D<br>Cutting tool start | Group E<br>Cutting tool EOL | Group G<br>New dies profile |
|---|---|---|---|---|---|---|---|---|---|
| Chattermarks Visual | | | OK | Borderline | KO | KO | OK | OK | OK |
| Chattermark level | Right | | 1,0 | 5,0 | 7,0 | 10,0 | 1,0 | 1,0 | 1,0 |
| | Left | | 1,0 | 5,0 | 7,0 | 10,0 | 1,6 | 1,2 | 1,0 |
| Surface analysys | Right | SAa | 0,130 | 0,152 | 0,431 | 0,604 | 0,142 | 0,131 | 0,130 |
| | | SAq | 0,167 | 0,209 | 0,495 | 0,707 | 0,198 | 0,167 | 0,170 |
| | | SAmp | 0,250 | 0,299 | 0,686 | 1,172 | 0,280 | 0,244 | 0,240 |
| | Left | SAa | 0,141 | 0,170 | 0,352 | 0,542 | 0,203 | 0,164 | 0,140 |
| | | SAq | 0,180 | 0,218 | 0,428 | 0,646 | 0,254 | 0,207 | 0,170 |
| | | SAmp | 0,265 | 0,304 | 0,570 | 0,886 | 0,358 | 0,299 | 0,240 |

FIG 5

CHECK METHOD OF WORM GEARS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a check method of worm gears.

2. Description of Related Art Including Information Disclosed Under 37 CFR 1.97 and 37 CFR 1.98

Several methods are known to check worm gears in order to assess the engagements to be rejected. The methods of the prior art provide for mounting the screw in a kit and analyzing the performance and the noise level of the kit with traditional instruments.

It appears evident that the check methods of the prior art are long, cumbersome and complicated because it is necessary to mount the screw in an assembling line and see if the screw passes the tests. Then, the screw is removed from the assembling line and is sent to the production department or is rejected according to the outcome of the test.

Moreover, these types of checks are not very reliable and do not guarantee the good quality of the screw.

BRIEF SUMMARY OF THE INVENTION

The purpose of the present invention is to eliminate the drawbacks of the prior art by disclosing a check method of worm gears that is practical, efficient, versatile, reliable, inexpensive and simple to use.

These purposes are achieved according to the invention with the characteristics of the independent claim 1.

Advantageous embodiments of the invention appear from the dependent claims.

The method of the invention permits to analyze the surface characteristics of the gears, checking the compliance with the tolerance limit values that are preset by the user in order to maximize the performance and minimize the noise generated by the gear.

The method of the invention permits to select the screws before they are inserted in the assembling line, thus optimizing the production cycle and guaranteeing a better quality.

The data used for the surface analysis of the screw is obtained with an electronic measuring system that makes a scan with a feeler in contact with the involute profile and with the helix profile of the tested screw, providing a sequence of points of the profile surface in Cartesian form that are suitably filtered and processed in order to obtain measurement accuracy and high fidelity to the real profile of the worm gear.

BRIEF DESCRIPTION OF THE SEVERAL VIEWS OF THE DRAWINGS

Additional features of the invention will appear manifest from the detailed description below, which refers to a merely illustrative, not limiting embodiment, as illustrated in the attached figures, wherein:

FIG. 5 is a table with experimental measurements made on seven groups of worm screws.

DETAILED DESCRIPTION OF THE INVENTION

Figure 6:
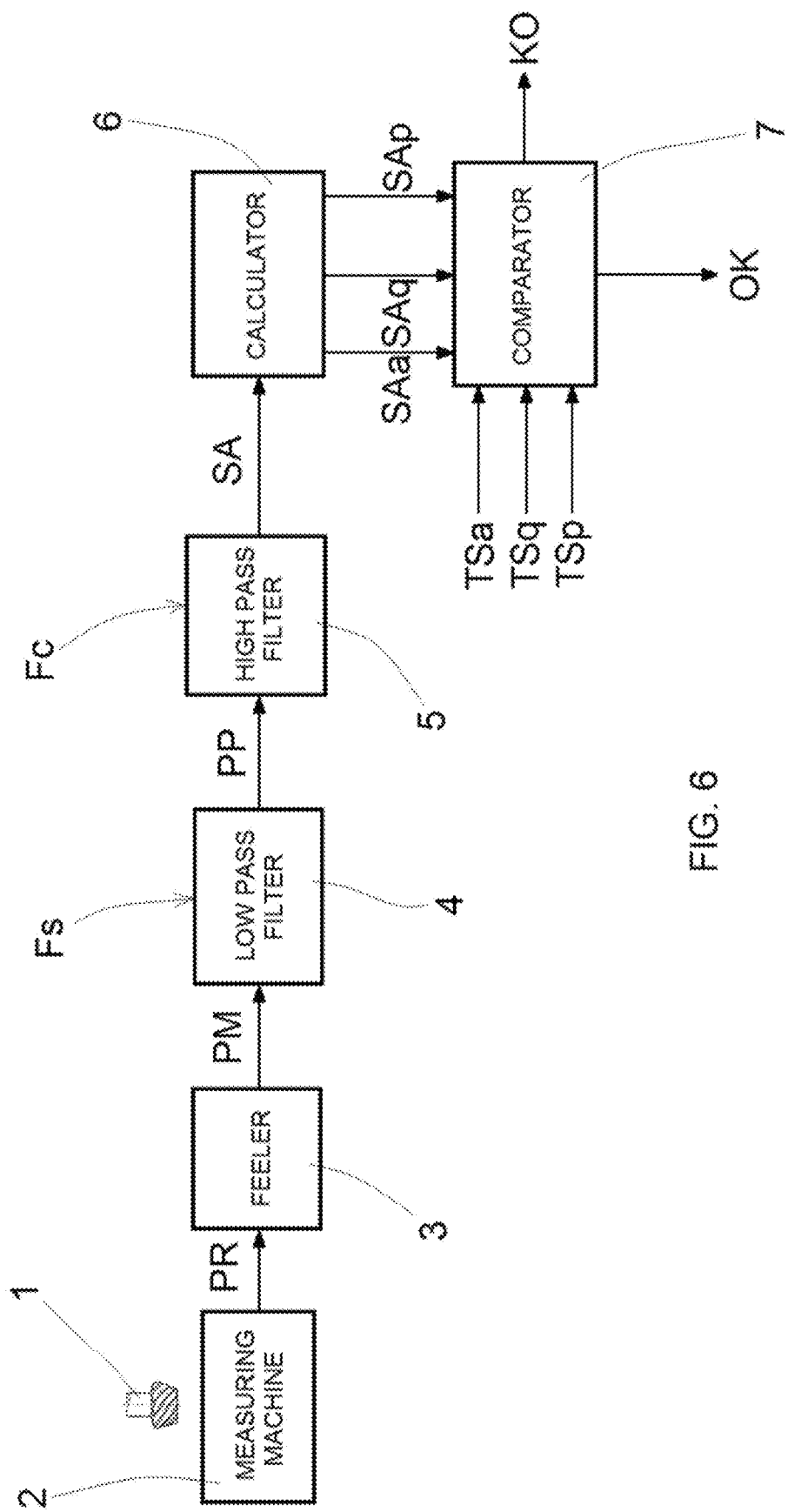
FIG. 6 is a block diagram that diagramatically shows the method according to the invention.

With reference to FIG. 6, the method of the invention provides ter analyzing four different profiles of a worm screw (I). The profiles to be analyzed are:

Real Profile (PR),
Measured Profile (PM)
Primary Profile (PP)
Surface Analysis Profile (SA)

Real Profile

The real profile (PR) is identified by means of a measuring machine (2), considering a plane that contains the axis of the gear (1). The real profile (PR) is given by the intersection of the external lateral surface of the gear with the plane that contains the axis of the gear.

Measured Profile

After identifying the real profile (PR), a feeler (3) scans the real profile (PR) in such a way to obtain a measured profile (PM). Therefore the real profile (PR) is mechanically filtered according to the radius of the feeler. The measured profile (PM) represents a deviation from a theoretical profile.

For illustrative purposes, the measured profile (PM) is obtained from a worm gear (1) using a feeler with cutting tool with 0.5 mm diameter, with a measurement software that collects a maximum of 3000 points on the involute and on the helical section of the screw.

The input data of the method according to the invention, i.e. the measured profile (PM), are not perfect virtual geometries (in this specific case, involute of circle and helix), but deviations from a perfect virtual geometry obtained with a sensor of the feeler that travels along a kinematic trajectory based on the construction data of the worm gear.

Primary Profile

The primary profile (PP) is obtained by filtering the measured profile (PM) with a low pass filter (4) with cut-off frequency (fs) that is inversely proportional to a lower threshold wavelength $\lambda_S$. Therefore, the low pass filter lets the frequencies under the cut-off frequency (Fs) pass and removes the wavelengths under the lower threshold wavelength $\lambda_S$ because they are not relevant.

The primary profile is calculated for the entire scanning length of the measured profile (PM).

The low pass filter (4) can be a Gauss filter. In the Gauss filter, the definition of the weight in the spatial domain (x) is given by the following expression $$S(x) = \frac{1}{\alpha\lambda}\exp\left[-\pi\left(\frac{x}{\alpha\lambda}\right)^2\right]$$

wherein $$\alpha = \sqrt{\frac{\ln 2}{\pi}} = 0.4697$$

$\lambda$ is the wavelength that is inversely proportional to the cut-off frequency of the filter.

For illustrative purposes, a lower threshold wavelength $\lambda=\lambda_S=7$ is chosen for the low pass filter.

Figure 1:
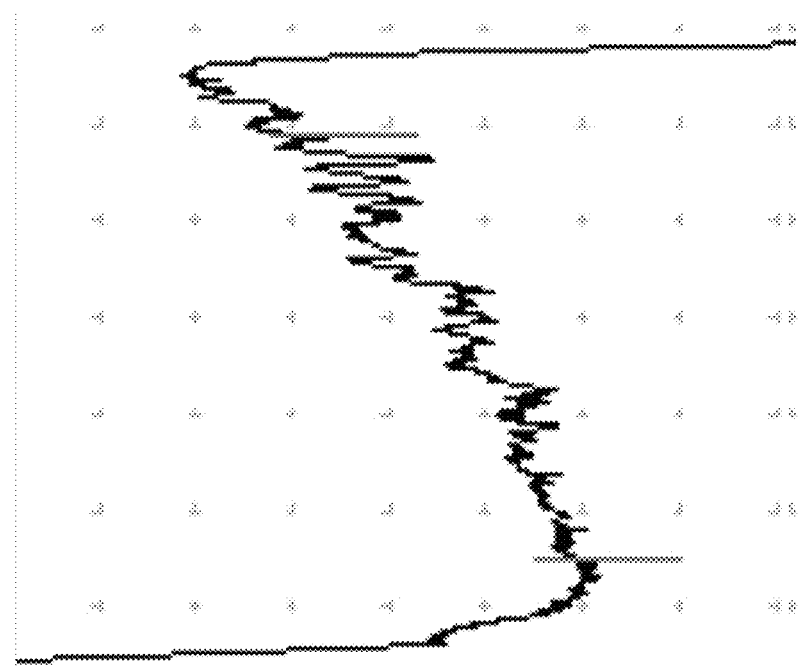
FIG. 1 shows a primary profile of involute obtained with a Gauss low pass filter.
Figure 1A:
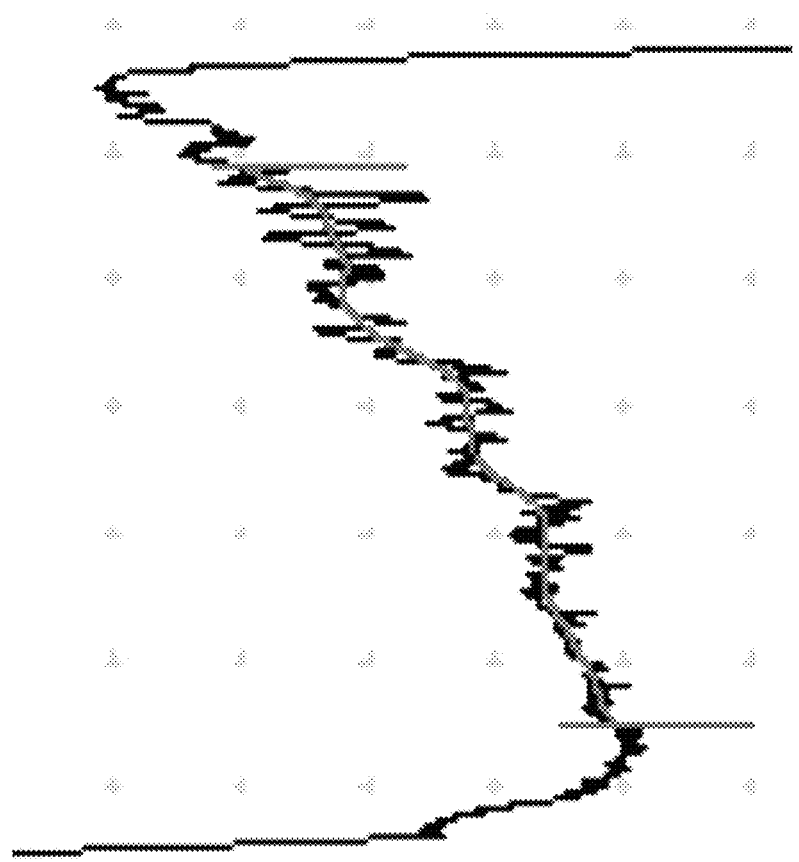
FIG. 1A shows a median line calculated on the primary profile of involute of FIG. 1.

FIG. 1 shows the primary profile of involute obtained with the Gauss low pass filter with lower threshold wavelength $\lambda=\lambda_S=7$. FIG. 1A shows a median line calculated on the primary profile of involute of FIG. 1.

Figure 2:
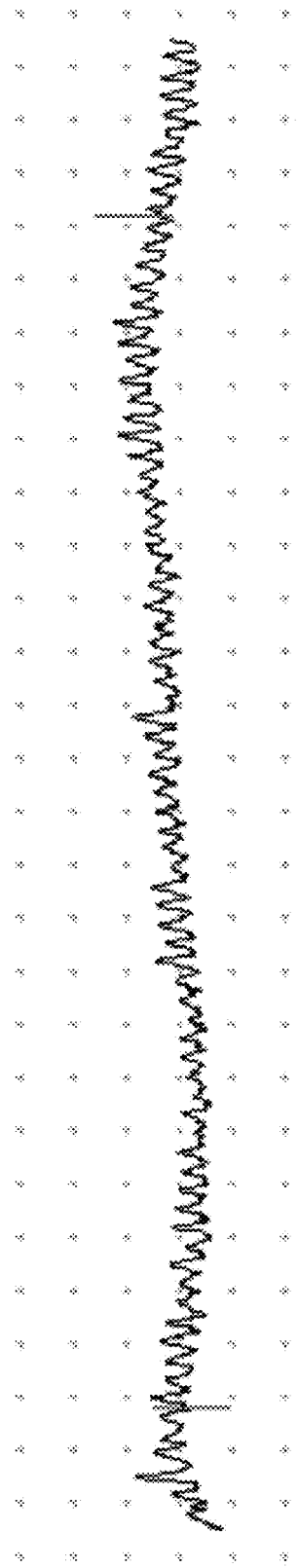
FIG. 2 shows a primary profile of helix obtained with a Gauss low pass filter.
Figure 2A:
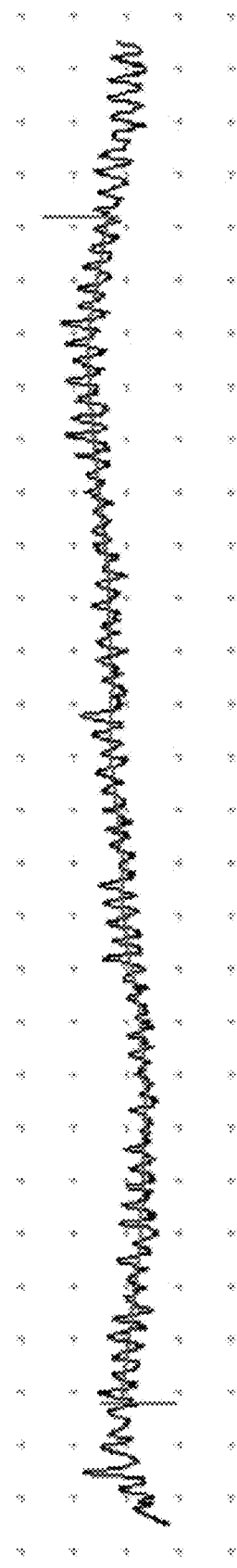
FIG. 2A shows a median line calculated on the primary profile of helix of FIG. 2.

FIG. 2 shows the primary profile of helix obtained with the Gauss low pass filter. FIG. 2A shows a median line calculated on the primary profile of helix of FIG. 2.

Surface Analysis Profile

The surface analysis profile (SA) is obtained by filtering the primary profile (PP) with a high pass filter (5) with cut-off frequency (fc) that is inversely proportional to an upper threshold wavelength $\lambda_C$.

Therefore the high pass filter lets the frequencies higher than the cut-off frequency (fc) pass and removes the wavelengths higher than the upper threshold wavelength $\lambda_C$ because they are not relevant.

The surface analysis profile (SA) is calculated for a length equal to approximately 80% of the scanning length of the measured profile.

The high pass filter (5) can be a Gauss filter like the low pass filter.

In the case of the high pass filter (5), the upper threshold wavelength $\lambda_C$ can be set by the user.

Advantageously, the upper threshold wavelength $\lambda_C$ is given by the number of points of the scan made by the feeler divided by 10, that is to say $$\lambda_C = \frac{\text{(number of scan points)}}{10}$$

Advantageously, the number of scan points can be higher than 2000; in this specific example, if the number of scan points is 3000, the upper threshold wavelength is $\lambda_C=300$.

Figure 3:
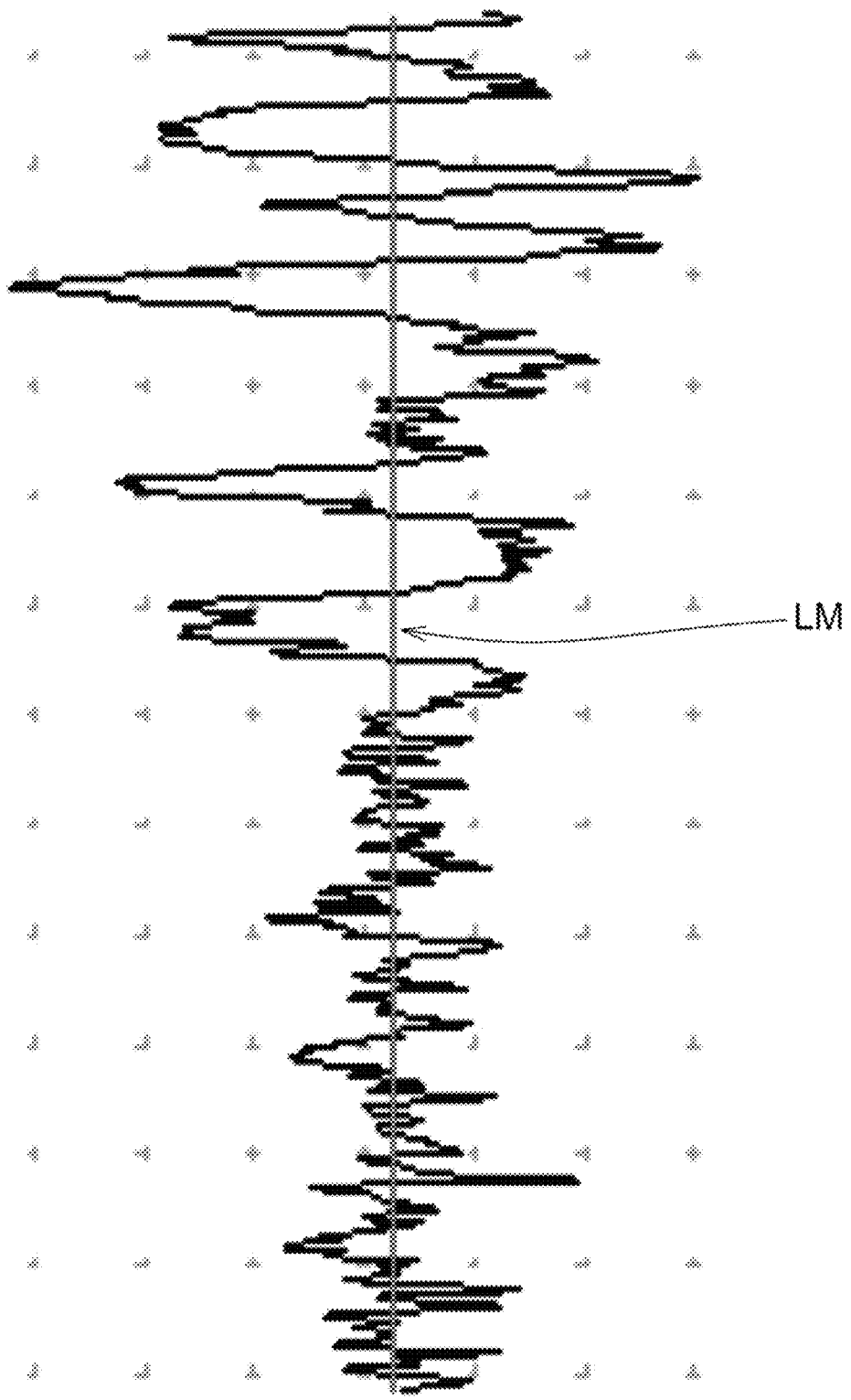
FIG. 3 shows a surface analysis profile of involute obtained with the Gauss high pass filter.
Figure 4:
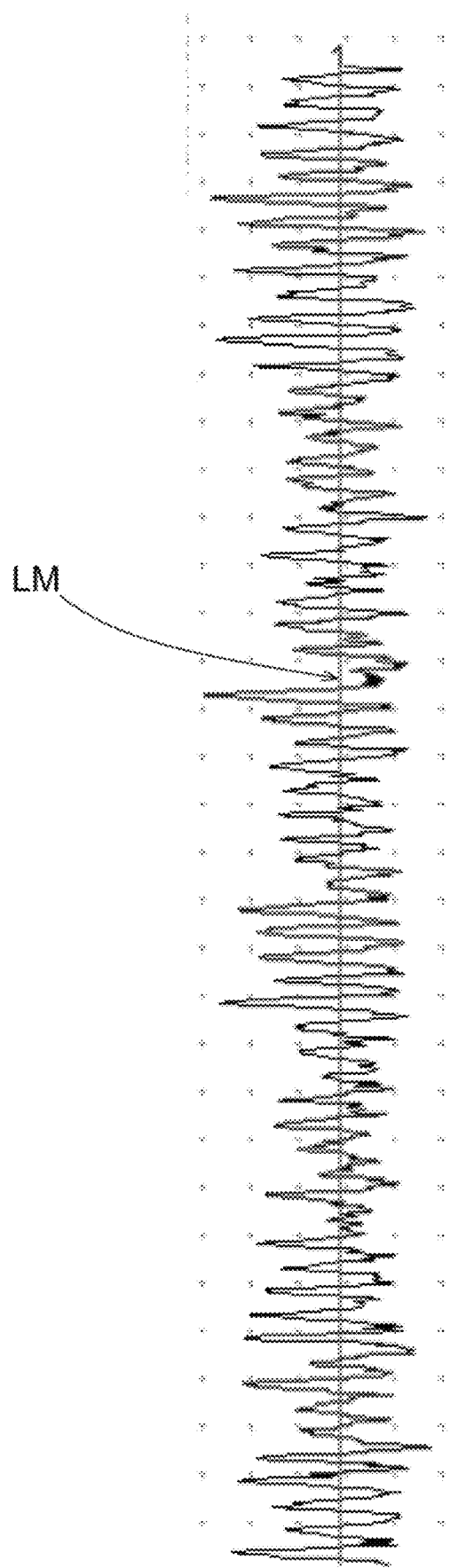
FIG. 4 shows a surface analysis profile of helix obtained a Gauss high pass filter.

FIGS. 3 and 4 respectively show the surface analysis profile (SA) of involute and of helix, obtained with the Gauss high pass filter, with upper threshold wavelength $\lambda=\lambda_C=300$, wherein a median line (LM) calculated in a known way with a calculator (6) is shown.

The surface analysis profile (SA) is used to calculate
a first error quadratic average parameter ($SA_a$);
a second quadratic error parameter ($SA_q$) and
a third peak average parameter ($SA_p$).

The error quadratic average (SAO is obtained from the following expression:

$$SA_a = \frac{\sum_i x_i}{n_p}$$

wherein $x_i$ are the absolute deviations of the points of the SA) profile from the median line of the SA profile; and $n_p$ is the number of points considered in the assessment analysis. Normally, in the (SA) profile the number of considered points is equal to approximately 80% of the number of scan points. Therefore, in this specific case, if the scan points are 3000, $n_p=2400$ The quadratic error ($SA_q$) is obtained from the following expression $$SA_q = \sqrt{\frac{\sum_i x_i^2}{n_p}}$$

The peak average ($SA_p$) is obtained from the following expression $$SA_p = \frac{\sum_i p_i}{n_p}$$

wherein $p_i$ are the peak points, whose distance from the median line of the SA profile is higher than the distances of at least four adjacent points.

The three parameters ($SA_a$; $SA_q$; $SA_p$) are calculated with the calculator (6). After calculating the parameters ($SA_a$; $SA_q$; $SA_p$), each of said parameters is compared with a corresponding threshold value (TSa; TSq; TSp) that is preset by the user. Such a comparison is made with a comparator (7).

If one of said parameters ($SA_a$; $SA_q$; $SA_p$) is above its threshold value (TSa; TSq; TSp), then the worm gear (1) must be rejected.

The threshold values (TSa; TSq; TSp) are calculated by the user based on experimental tests according to the type of worm gear to be analyzed.

FIG. 5 shows the results of the tests made on seven groups of worm gears (A, B, C, F, D, E, G).

The chattermark of the screws mounted in a kit was measured with traditional instruments. Moreover, the following parameters were calculated: error arithmetical average ($SA_a$), quadratic error ($SA_q$) and peak average ($SA_p$), on each side of the screw thread.

As shown in FIG. 5, the screws of groups C and F have unacceptable chattermark values, the screw of group B has borderline chattermark values; whereas the screws of groups A, D, E and G have very low chattermark values that are perfectly acceptable. These results are perfectly reflected in the values of the parameters ($SA_a$; $SA_q$; $SA_p$) calculated with the method of the invention.

Therefore, according to said experimental results, the threshold values (TSa; TSq; TSp) of the three parameters ($SA_a$; $SA_q$; $SA_p$) can be found.

For merely illustrative purposes, a table is given below, with the threshold values (TSa; TSq; TSp) calculated based on the experimental tests made on the groups of screws of FIG. 5.

| | |
|---|---|
| TSa | 0.4 |
| TSq | 0.5 |
| TSp | 0.6 |

Numerous equivalent variations and modifications can be made to the present embodiment of the invention, which are within the reach of an expert of the field and fall in any case within the scope of the invention as disclosed by the claims.

I claim:

1. A method of inspecting a worm gear, the method comprising:

directing a measuring machine to the worm gear so as to determine a real profile of the worm gear, the real profile being an intersection of an external lateral surface of the worm gear with a plane that contains an axis of the worm gear;

scanning the real profile of the worm gear with a feeler so as to obtain a measured profile of the worm gear;

filtering the measured profile with a low pass filter having a preset cut-off frequency so as to obtain a primary profile of the worm gear;

filtering the primary profile with a high pass filter with another preset cut-off frequency so as to obtain a surface analysis profile of the worm gear;

determining a median line of the surface analysis profile;

calculating of a first quadratic error average parameter by the following formula:

$$SA_a = \frac{\sum_i x_i}{np}$$

wherein $x_i$ are absolute deviations of points of the surface analysis profile from the determined median line of the surface analysis profile and np is a number of points considered in the surface analysis profile;

calculating a second quadratic error parameter by the following formula:

$$SA_q = \sqrt{\sum_i x_i^2}$$

calculating a third peak average parameter by the following formula:

$$SA_p = \frac{\sum_i p_i}{np}$$

wherein $p_i$ are peak points with a distance from the median line of the surface analysis profile that is greater than distances of at least four adjacent points;

comparing the first quadratic error average parameter and the second quadratic error parameter and the third peak average parameter with corresponding threshold values; and rejecting the worm gear if one of the first error quadratic average parameter and the second quadratic error parameter and the third peak average parameter exceeds the corresponding preset threshold values.

2. The method of claim 1, wherein the low pass filter or the high pass filter is a Gauss filter.

3. The method of claim 2, wherein the cut-off frequency of the low pass filter is inversely proportional to a lower threshold wavelength value equal to 7.

4. The method of claim 2, wherein the another cut-off frequency of the high pass filter is inversely proportional to an upper threshold wavelength value and is proportional to a number of points that are taken by the step of scanning.

5. The method of claim 4, wherein the upper threshold wavelength value is equal to the number of points taken by the step of scanning divided by 10.

6. The method of claim 1, wherein the number of points considered in the surface analysis profile is equal to approximately 80% of a number that is taken by the step of scanning.

7. The method of claim 1, wherein the feeler scans with a number of points greater than 2000.

8. The method of claim 1, wherein the preset threshold values comprise a first threshold value of 0.4 corresponding to the first quadratic error average parameter, a second threshold value of 0.5 corresponding to the second quadratic error parameter, and a third threshold value of 0.6 corresponds to the third peak average parameter.

* * * * *